United States Patent [19]

Forster

[11] Patent Number: 5,528,978
[45] Date of Patent: Jun. 25, 1996

[54] HYDROMECHANICAL DRIVE ASSEMBLY

[75] Inventor: Franz Forster, Karlstadt-Muhlbach, Germany

[73] Assignee: Linde Aktiengellschaft, Germany

[21] Appl. No.: 23,926

[22] Filed: Feb. 26, 1993

[30] Foreign Application Priority Data

Feb. 27, 1992 [DE] Germany ............ 42 06 088.5

[51] Int. Cl.$^6$ ............................................. F01B 9/00
[52] U.S. Cl. ................. 92/140; 475/83; 475/337
[58] Field of Search ................ 475/83, 337; 92/140

[56] References Cited

U.S. PATENT DOCUMENTS

| | | | |
|---|---|---|---|
| 890,065 | 6/1908 | Kellow . | |
| 1,281,785 | 10/1918 | Kellow | 475/337 |
| 4,040,312 | 8/1977 | Tappan et al. | 74/83 |
| 4,133,344 | 1/1979 | Hunter et al. | 475/337 |
| 4,397,201 | 8/1983 | Mann | 475/83 |
| 4,583,425 | 4/1986 | Mann et al. | 475/83 |
| 4,848,663 | 7/1989 | Sherbrooke | 475/83 |
| 4,987,788 | 1/1991 | Bausch | 475/337 |

FOREIGN PATENT DOCUMENTS

| | | | |
|---|---|---|---|
| 2646380 | 11/1990 | France | 475/83 |
| 2144063 | 3/1972 | Germany . | |
| 2130513 | 12/1972 | Germany . | |
| 3307047 | 8/1984 | Germany . | |
| 1391006 | 4/1975 | United Kingdom . | |

*Primary Examiner*—F. Daniel Lopez
*Attorney, Agent, or Firm*—Webb Ziesenheim Bruening Logsdon Orkin & Hanson

[57] ABSTRACT

A hydromechanical drive assembly having a hydrostatic axial piston motor with a housing and a swash plate and a cylindrical drum located in the housing. A transmission having a housing is located downstream of and coaxial with the axial piston motor and a planetary gear is located in the transmission. A transmission-side driven shaft extends out of each end of the drive assembly. The cylindrical drum and the driven shaft have the same axis of rotation. Spring-actuated hydraulically releasable devices are located in the housing to non-rotatably connect the cylindrical drum of the axial piston motor directly to a ring gear which is non-rotatably connected to the driven shaft.

21 Claims, 4 Drawing Sheets

HYDROMECHANICAL DRIVE ASSEMBLY

BACKGROUND OF THE INVENTION

1. Field of the Invention

The invention relates generally to a hydromechanical drive assembly, and more particularly to a hydromechanical drive assembly having a hydrostatic swash-plate type axial piston motor and a mechanical transmission located downstream of the axial piston. The transmission has a driven shaft and the axis of rotation of the driven shaft is coaxial with the axis of rotation of the cylindrical drum of the axial piston motor.

2. Description of Related Prior Art

United Kingdom Patent No. 1,391,006 discloses such a hydromechanical drive assembly wherein the torque of the axial piston motor is not transmitted to its shaft as in the conventional manner. Instead, the torque is transmitted to teeth on the outside diameter of the cylindrical drum which transmit it through the web of a planetary gear to a transmission-side driven shaft. The shaft of the axial piston motor is connected to the housing so that it cannot rotate and serves as a bearing for the cylindrical drum and absorbs reaction forces of the work pistons. The design of the drive assembly of the aforementioned United Kingdom patent includes many individual parts, resulting in high fabrication and installation costs. Furthermore, the scope of the application of the drive assembly is restricted to a hub drive for single-wheel vehicles. Additionally, the drive assembly is not well suited for applications in which high lateral forces affect the transmission-side driven shaft, such as when driving the slewing gear of an excavator, because the space between the two bearings for the driven shaft is small.

SUMMARY OF THE INVENTION

The object of the present invention is to provide a hydromechanical drive assembly having a relatively lower number of component parts than prior art transmissions and having compact dimensions, which can be used in a wide variety of applications.

In order to achieve this object, the invention has an axial piston motor with a cylindrical drum without an intermediate connection to a motor-side shaft. The cylindrical drum is mounted in the housing of the axial piston motor. The cylindrical drum is non-rotatably connected to the sun gear of the first stage of the transmission which surrounds the driven shaft which extends through the hydromechanical drive assembly coaxially with the cylindrical drum. An essential aspect of the invention is a "shaftless" axial piston motor and a transmission-side driven shaft which is lengthened in the direction of the axial piston motor so that the transmission-side driven shaft passes through the cylindrical drum in place of the motor-side shaft as in a conventional arrangement. The arrangement provides a greater distance between the shaft bearings and requires relatively fewer component parts.

According to the invention, the axial piston motor and the mechanical transmission are coaxially aligned so that one bearing for the driven shaft is located on the axial end of the transmission spaced from the axial piston motor and a second bearing is located on the axial end of the axial piston motor spaced from the transmission. A drive assembly constructed in this manner has compact radial dimensions.

It is particularly advantageous if the transmission includes a planetary gear and a sun gear non-rotatably connected to the cylindrical drum. A ring gear can be formed directly on the housing of the planetary gear and a web is non-rotatably connected to the driven shaft. As a result, there is only one axis of rotation.

In another embodiment of the invention, the planetary gear has two stages, whereby the web of the first stage is non-rotatably connected to the sun gear of the second stage, and the web of the second stage is non-rotatably connected to the driven shaft. There is a common ring gear for both stages of the planetary gear. The common ring gear can be formed directly on the inner wall of a housing which simplifies fabrication and installation of the hydromechanical drive assembly according to the invention.

With the hydromechanical drive assembly according to the invention, the cylindrical drum of the axial piston motor can be mounted on the transmission-side driven shaft. However, it is advantageous in certain applications if the outside of the cylindrical drum is mounted in the housing of the axial piston motor. In this arrangement, the space inside the cylindrical drum can receive a reduced-diameter driven shaft.

According to a particularly advantageous embodiment of the invention, the driven shaft extends completely through the axial piston motor and the planetary gear to project out of both ends of the hydromechanical drive assembly and positive or non-positive locking mounting devices are attached to each end. Such a hydromechanical drive assembly is used in a vehicle drive system having two powered axles wherein the hydromechanical drive assembly is located between the axles. A counter shaft extends to each vehicle axle and one end of each counter shaft is connected to the driven shaft of the hydromechanical drive system.

A complete understanding of the invention will be obtained from the following description when taken in connection with the accompanying drawings wherein like reference characters identify like parts throughout.

DESCRIPTION OF THE PREFERRED EMBODIMENTS

Figure 1:
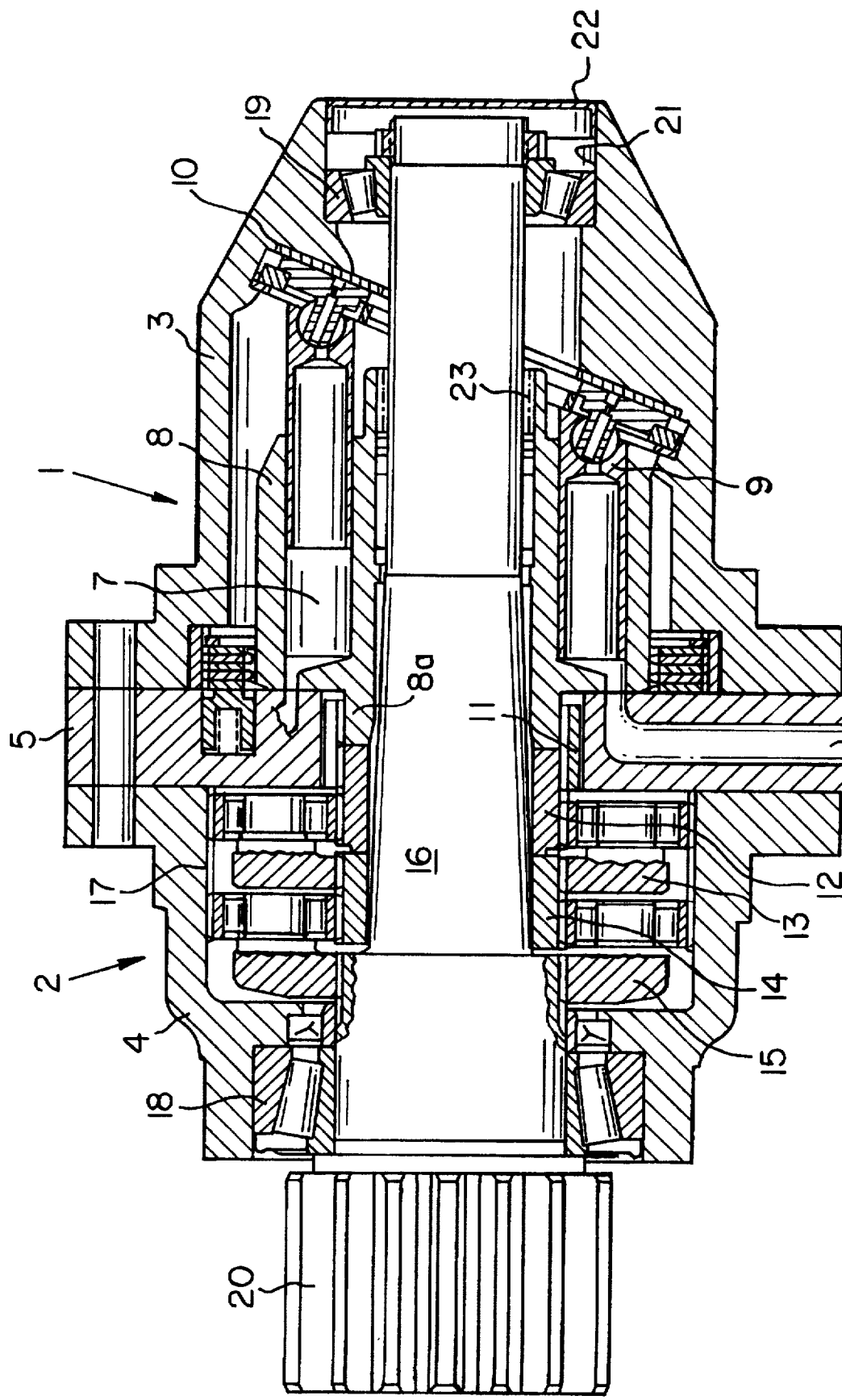
FIG. 1 is a longitudinal section through a hydromechanical drive assembly according to the invention.

The hydromechanical drive assembly shown in FIG. 1 of the drawings has an axial piston motor 1 and a two-stage planetary gear 2 located downstream of the axial piston motor. A housing 3 of axial piston motor 1 and a housing 4 of planetary gear 2 are fastened to an intermediate connecting flange 5 which has pressure medium conduits 6 formed therein for providing a hydraulic medium under pressure to work cylinders 7 located in cylindrical drum 8. Longitudinally movable work pistons 9 are provided in work cylinders 7, and an end of each work piston is in contact with a swash plate 10. Because the angle between swash plate 10 and the axis of rotation of cylindrical drum 8 cannot change, the axial piston motor has a constant intake volume. However, an axial piston motor having a variable intake volume in which the swash plate can pivot to adjust the angle between the swash plate and the axis of rotation of the cylindrical drum can be used.

Cylindrical drum 8 is non-rotatably connected by a gear 8a and a wedge-shaped slide 11 to a sun gear 12 in the first stage of the planetary gear. A web 13 of the first stage of the planetary gear is non-rotatably connected to a sun gear 14 in the second stage of the planetary gear. A web 15 of the second stage of the planetary gear is non-rotatably connected to a driven shaft 16. Both stages of the planetary gear utilize a common ring gear 17.

Driven shaft 16 extends completely through the hydromechanical drive assembly and is mounted in roller bearings 18 and 19 located at the opposite ends of the assembly. A gear 20 is connected to the end of driven shaft 16 adjacent to bearing 18 which is intended to mesh with a drive ring of an excavator. The gear 20 can be cast directly on driven shaft 16, if desired.

The end of driven shaft 16 adjacent to bearing 19 is located in a central opening 21 in housing 3 and the opening is closed by a cover 22. Because the primary load on driven shaft 16 is in the region of planetary gear 2, the diameter of driven shaft 16 in the region of axial piston motor 1 is reduced. The reduced shaft makes it possible to use a bearing 19 with a smaller diameter than bearing 18, which results in a less expensive drive assembly.

Slide 11 connects cylindrical drum 8 and sun gear 12 in the first stage of the planetary gear and the slide supports one end of the cylindrical drum. A bearing 23 located between the interior of cylindrical drum 8 and the exterior of driven shaft 16 supports the other end of the cylindrical drum. Because the diameter of the driven shaft is reduced at bearing 23, a smaller and less expensive bearing can be used.

Figure 2:
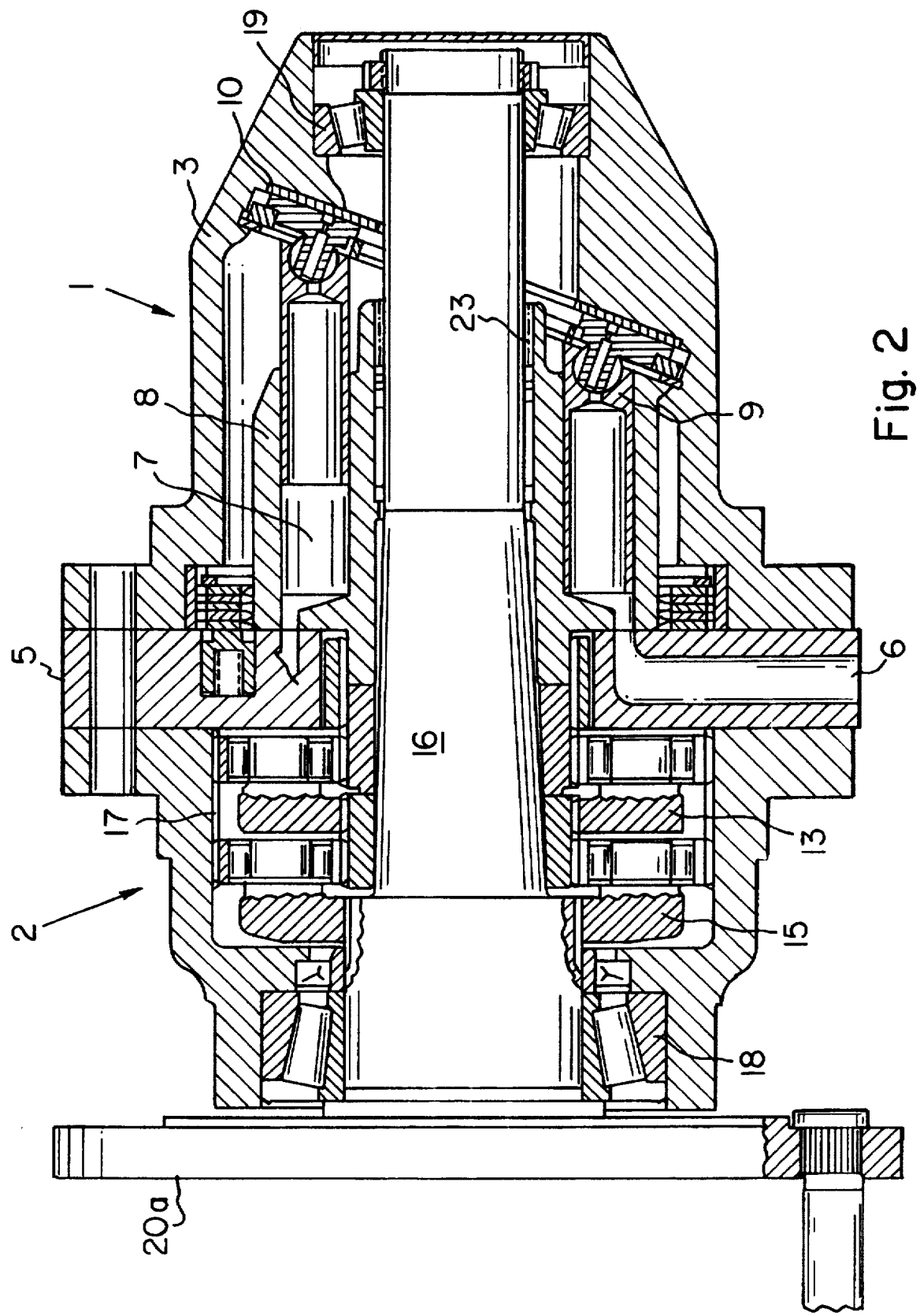
FIG. 2 is a longitudinal section through a second embodiment of a hydromechanical drive assembly according to the invention.

The hydromechanical drive assembly according to FIG. 2 of the drawings differs from that shown in FIG. 1 of the drawings in that driven shaft 16 is intended to drive a wheel, and therefore it has a wheel flange 20a fixed on the end adjacent to bearing 18. The wheel flange 20a replaces gear 20 shown in FIG. 1 of the drawings. Wheel flange 20a may be attached to or formed directly on driven shaft 16. By replacing a wheel flange 20a or driven shaft 16 with wheel flange 20a formed directly thereon, the hydromechanical drive assembly can be easily retrofitted for a different application.

Figure 3:
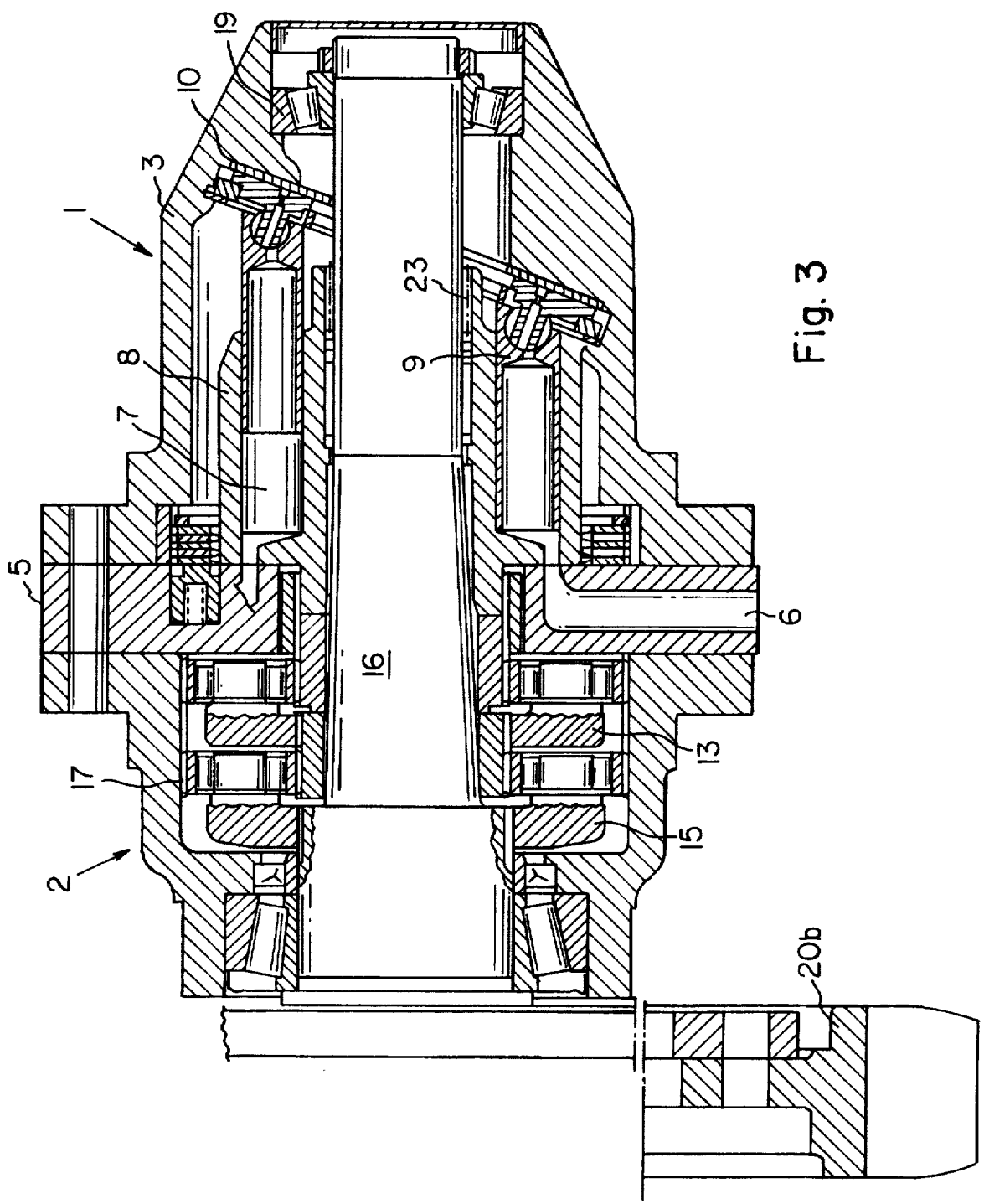
FIG. 3 is a longitudinal section through a third embodiment of a hydromechanical drive assembly according to the invention for the tumbler gear of a crawler drive.

The hydromechanical drive assembly shown in FIG. 3 of the drawings differs from that shown in FIG. 1 of the drawings in that driven shaft 16 is intended to drive a crawler of a tracked vehicle and therefore has a tumbler gear 20b located at the end of shaft 16 adjacent to bearing 18. Tumbler gear 20b may be attached to or formed directly on driven shaft 16. In the embodiments of the hydromechanical drive assembly shown in FIGS. 2 and 3 of the drawings, the second stage of the planetary gear can be eliminated, if desired, and web 13 of the first stage can be directly connected to driven shaft 16.

Figure 4:
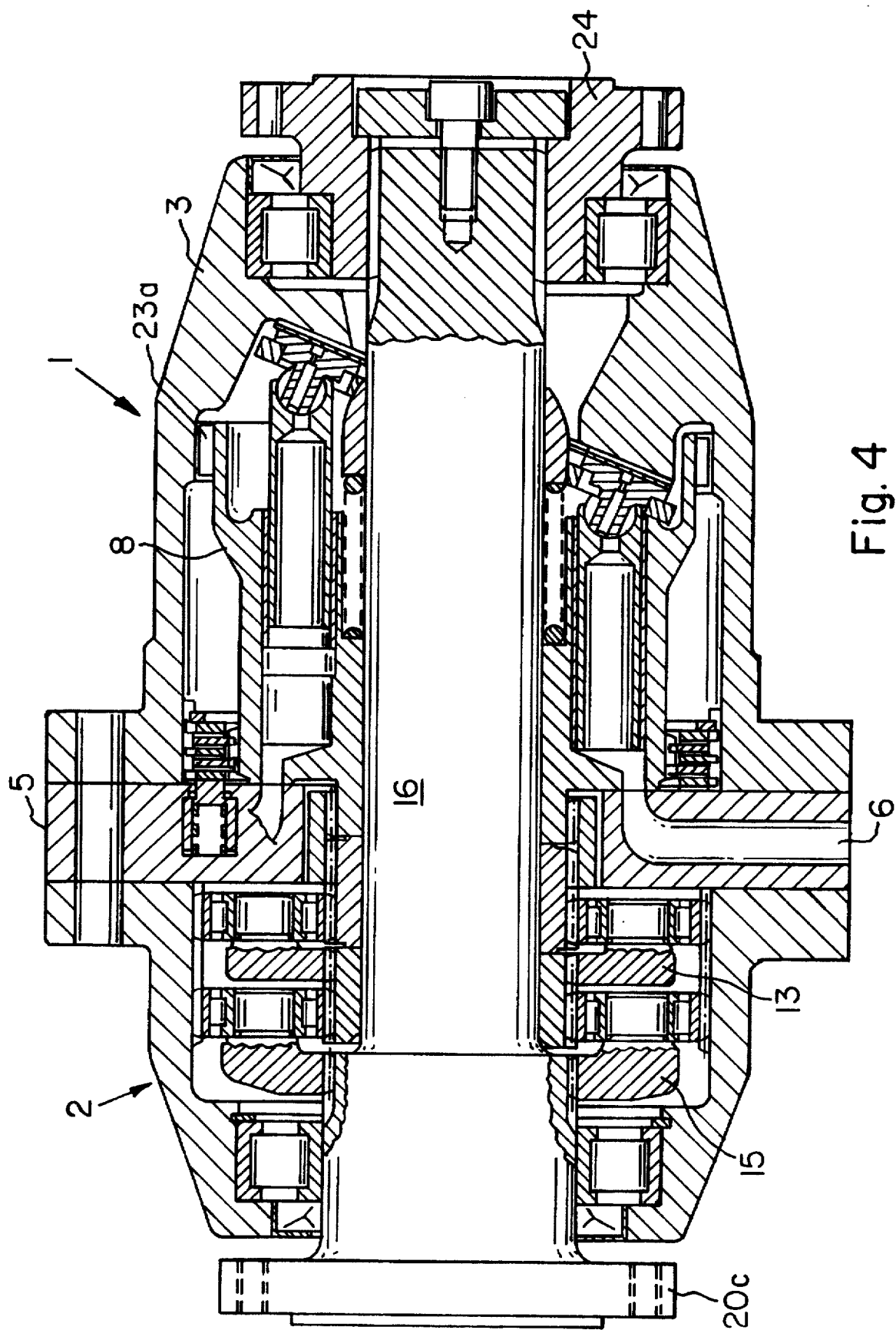
FIG. 4 is a longitudinal section through a fourth embodiment of a hydromechanical drive assembly according to the invention for a vehicle drive system having two powered axles.

The hydromechanical drive assembly shown in FIG. 4 of the drawings differs from that shown in FIGS. 1–3 of the drawings in that driven shaft 16 projects out of both ends of the drive assembly and has mounting flanges 20c and 24 located at each end. The end of cylindrical drum 8 located adjacent to swash plate 10 is mounted on a bearing 23a in housing 3 of the axial piston motor. Driven shaft 16 has a substantially uniform diameter except for the enlarged diameter portion adjacent to mounting flange 20c. The entire torque can be transmitted from each end of driven shaft 16 and a hydromechanical drive assembly according to this embodiment of the invention is intended to be used in a vehicle drive system having two powered axles. The hydromechanical drive assembly is located between the axles and an intermediate shaft extends to each vehicle axle. Each shaft is connected to one end of driven shaft 16 by one of mounting flanges 20c and 24.

While specific embodiments of the invention have been described in detail herein, it will be appreciated by those skilled in the art that various modifications and alternatives to the embodiments could be developed in light of the overall teachings of the disclosure. Accordingly, the particular arrangements are illustrative only and are not limiting as to the scope of the invention which is to be given the full breadth of the appended claims and any and all equivalents thereof.

I claim:

1. A hydromechanical drive assembly consisting of a hydrostatic axial piston motor having an outer motor housing, a swash plate and a cylindrical drum located in said outer motor housing, a mechanical transmission having an outer transmission housing aligned with said outer motor housing and located downstream of and coaxial with said axial piston motor and at least one sun gear coaxial with said axial piston motor, a shaft coaxial with said mechanical transmission and said cylindrical drum extending through said mechanical transmission and said axial piston motor, and means including said sun gear for operatively connecting said cylindrical drum in said axial piston motor to said shaft, whereby rotation of said cylindrical drum rotates said shaft.

2. A hydromechanical drive assembly as set forth in claim 1 wherein said means for operatively connecting said cylindrical drum to said shaft includes said sun gear in a first stage of said mechanical transmission and first stage planetary gears mounted for rotation within said outer transmission housing and means for connecting said first stage planetary gears to said shaft.

3. A hydromechanical drive assembly as set forth in claim 1 including a second stage sun gear rotatably mounted on said driven shaft and wherein said first stage planetary gears are mounted on a first stage web non-rotatably connected to said second stage sun gear and wherein said means for connecting said first stage planetary gears to said shaft includes said second stage sun gear, a second stage web and second stage planetary gears mounted on said second stage web for rotation within said outer transmission housing, said second stage web being non-rotatably connected to said shaft.

4. A hydromechanical drive assembly as set forth in claim 3 including a ring gear formed on the internal surface of said outer transmission housing, whereby said first stage planetary gears and said second stage planetary gears rotate around said ring gear to rotate said first stage web and said second stage web.

5. A hydromechanical drive assembly as set forth in claim 4 wherein said shaft extends longitudinally completely through said axial piston motor and projects out of each end of the hydromechanical drive assembly and including a mounting means on at least one end of said shaft.

6. A hydromechanical drive assembly as set forth in claim 3 wherein said shaft extends longitudinally completely through said axial piston motor and projects out of each end of the hydromechanical drive assembly and including a mounting means on at least one end of said shaft.

7. A hydromechanical drive assembly as set forth in claim 6 wherein said mounting means is a positive type.

8. A hydromechanical drive assembly as set forth in claim 1 including means for mounting said cylindrical drum in said outer motor housing at a distance from said mechanical transmission and wherein said at least one sun gear forms bearing for mounting said cylindrical drum.

9. A hydromechanical drive assembly as set forth in claim 2 wherein said shaft extends longitudinally completely through said axial piston motor and projects out of each end of the hydromechanical drive assembly and including a mounting means on at least one end of said shaft.

10. A hydromechanical drive assembly as set forth in claim 9 wherein said mounting means is a positive type.

11. A hydromechanical drive assembly as set forth in claim 1 including first bearing means for said shaft located at the end of said outer transmission housing spaced from said axial piston motor and second bearing means for said shaft located at the end of said outer motor housing spaced from said mechanical transmission.

12. A hydromechanical drive assembly as set forth in claim 11 wherein said shaft extends longitudinally completely through said axial piston motor and projects out of each end of the hydromechanical drive assembly and including a mounting means on at least one end of said shaft.

13. A hydromechanical drive assembly as set forth in claim 1 wherein said means for operatively connecting said cylindrical drum to said shaft includes a second sun gear, a first web non-rotatably connected to said second sun gear and planetary gears mounted on said first web, a second web operatively connected to said driven shaft and planetary gears mounted on said second sun web driven by said second gear, whereby rotation of said cylindrical drum rotates said shaft by means of said sun gears and said planetary gears.

14. A hydromechanical drive assembly as set forth in claim 13 wherein said shaft extends longitudinally completely through said axial piston motor and projects out of each end of the hydromechanical drive assembly and including a mounting means on at least one end of said shaft.

15. A hydromechanical drive assembly as set forth in claim 1 wherein said shaft extends longitudinally completely through said axial piston motor and said mechanical transmission and projects out of each end of the hydromechanical drive assembly and including a mounting means on at least one end of said shaft.

16. A hydromechanical drive assembly as set forth in claim 15 wherein said mounting means is a positive type.

17. A hydromechanical drive assembly as set forth in claim 2 including a second stage sun gear and a second stage web non-rotatably connected to said shaft, a plurality of planetary gears mounted on said second stage web which are rotated within said stationary transmission housing to rotate said second stage web, whereby rotation of said second stage web rotates said shaft.

18. A hydromechanical drive assembly as set forth in claim 17 including an internal surface on said outer transmission housing and a ring gear formed on said internal surface of said outer transmission housing, said ring gear having a plurality of longitudinal splines adapted to cooperate with said planetary gears on said first and second stage webs, whereby rotation of said planetary gears rotates said first and second stage webs.

19. A hydromechanical drive assembly consisting of a hydrostatic axial piston motor having an outer motor housing, a swash plate and a cylindrical drum located in said outer motor housing, a mechanical transmission having an outer transmission housing aligned with said outer motor housing and a planetary gear located downstream of and coaxial with said axial piston motor and including at least one sun gear coaxial with said axial piston motor, a shaft coaxial with said mechanical transmission and with said cylindrical drum extending through said mechanical transmission and said axial piston motor, first stage planetary gears mounted for rotation within said outer transmission housing, longitudinal axially extending external splines formed on said cylindrical drum and on said sun gear, and a slide member surrounding a portion of said cylindrical drum and said sun gear, said slide member having longitudinal axially extending internal splines cooperating with said longitudinal axially extending external splines on said cylindrical drum and said sun gear for non-rotatably connecting said cylindrical drum to said sun gear, whereby rotation of said cylindrical drum rotates said slide to rotate said sun gear and said shaft.

20. A hydromechanical drive assembly as set forth in claim 19 wherein said shaft extends longitudinally completely through said axial piston motor and projects out of each end of the hydromechanical drive assembly and including a mounting means on at least one end of said shaft.

21. A hydromechanical drive assembly as set forth in claim 20 wherein said mounting means is a positive type.

* * * * *

UNITED STATES PATENT AND TRADEMARK OFFICE
CERTIFICATE OF CORRECTION

PATENT NO. : 5,528,978
DATED : June 25, 1996
INVENTOR(S) : Franz Forster

It is certified that error appears in the above-indentified patent and that said Letters Patent is hereby corrected as shown below:

Title page, item '[73] Assignee:', "Aktiengellschaft" should read --Aktiengesellschaft--.

Claim 3 Lines 39-40 Column 4 "claim 1" should read --claim 2--.

Claim 8 Line 4 Column 5 after "forms" insert --a--.

Claim 13 Line 29 Column 5 delete "driven".

Signed and Sealed this

First Day of October, 1996

*Attest:*

BRUCE LEHMAN

*Attesting Officer*  *Commissioner of Patents and Trademarks*